(12) United States Patent
Chang

(10) Patent No.: US 7,854,540 B2
(45) Date of Patent: Dec. 21, 2010

(54) OPTICAL PLATE AND BACKLIGHT MODULE USING SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 277 days.

(21) Appl. No.: 12/261,213

(22) Filed: Oct. 30, 2008

(65) Prior Publication Data

US 2009/0290341 A1  Nov. 26, 2009

(51) Int. Cl.
  *G02F 1/13357* (2006.01)
(52) U.S. Cl. .................. 362/633; 362/97.1
(58) Field of Classification Search ........... 362/97.1, 362/224, 217.04, 244, 291, 334, 633
See application file for complete search history.

(56) References Cited

U.S. PATENT DOCUMENTS 6,273,591 B1 * 8/2001 Albou ................. 362/334

* cited by examiner

*Primary Examiner*—David V Bruce
(74) *Attorney, Agent, or Firm*—Clifford O. Chi

(57) ABSTRACT

An exemplary optical plate includes a first surface and a second surface opposite the first surface. The first surface defines a plurality of substantially parallel elongated arc-shaped grooves therein. A plurality of substantially parallel elongated arc-shaped protrusions is formed on the second surface. An extending direction of the elongated arc-shaped grooves are substantially parallel to an extending direction of the elongated arc-shaped protrusions.

18 Claims, 5 Drawing Sheets

OPTICAL PLATE AND BACKLIGHT MODULE USING SAME

BACKGROUND

1. Field of the Invention

The present invention relates to an optical plate and a backlight module using the same and, particularly, to an optical plate and a backlight module using the same employed in a liquid crystal display.

2. Description of the Related Art

Referring to FIGS. 4 and 5, a typical direct type backlight module 100 includes a frame 11, a plurality of light sources 12, a light diffusion plate 13, and a typical prism sheet 10. The light sources 12 are positioned in an inner side of the frame 11. The light diffusion plate 13 and the typical prism sheet 10 are positioned on the light sources 12 above a top of the frame 11. The light diffusion plate 13 includes a plurality of diffusing particles (not shown) configured for diffusing light. The typical prism sheet 10 includes a transparent substrate 101 and a prism layer 103 formed on a surface of the transparent substrate 101. A plurality of elongated V-shaped ridges 105 is formed on the prism layer 103.

In use, light emitted from the light sources 12 enters the diffusion plate 13 and becomes scattered. The scattered light leaves the diffusion plate 13, travels through the typical prism sheet 10, and is refracted out at the elongated V-shaped ridges 105.

The refracted light leaving the typical prism sheet 10 is concentrated at the prism layer 103 and increases the brightness of the prism sheet 10. The refracted light propagates into a liquid crystal display panel (not shown) positioned above the prism sheet 10.

However, although light from the light sources 12 enters the diffusion plate 13 and becomes scattered, the light leaves the prism sheet 10, and forms strong light spots.

In order to reduce or eliminate the strong light spots, the backlight module 100 should further include an upper light diffusion film 14 positioned on the prism sheet 10.

However, although the upper light diffusion film 14 and the typical prism sheet 10 are contacting each other, a plurality of air pockets exist around the boundaries of the light diffusion film 14 and the typical prism sheet 10. When light passes through the air pockets, some of the light undergoes total reflection along one or another of the corresponding boundaries. In addition, the upper light diffusion film 14 may absorb a certain amount of the light from the prism sheet 10. As a result, a brightness of light illumination of the backlight module 100 is reduced.

Therefore, a new optical plate and a new backlight module are desired to overcome the above-described shortcomings.

SUMMARY

An optical plate includes a first surface and a second surface opposite the first surface. The first surface defines a plurality of substantially parallel elongated arc-shaped grooves therein. A plurality of substantially parallel elongated arc-shaped protrusions is formed on the second surface. An extending direction of the elongated arc-shaped grooves is parallel to an extending direction of the elongated arc-shaped protrusions.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate. Moreover, in the drawings, like reference numerals designate corresponding parts throughout several views, and all the views are schematic.

DETAILED DESCRIPTION OF THE EXEMPLARY EMBODIMENTS

Reference will now be made to the drawings to describe embodiments of the present optical plate in detail.

Figure 1:
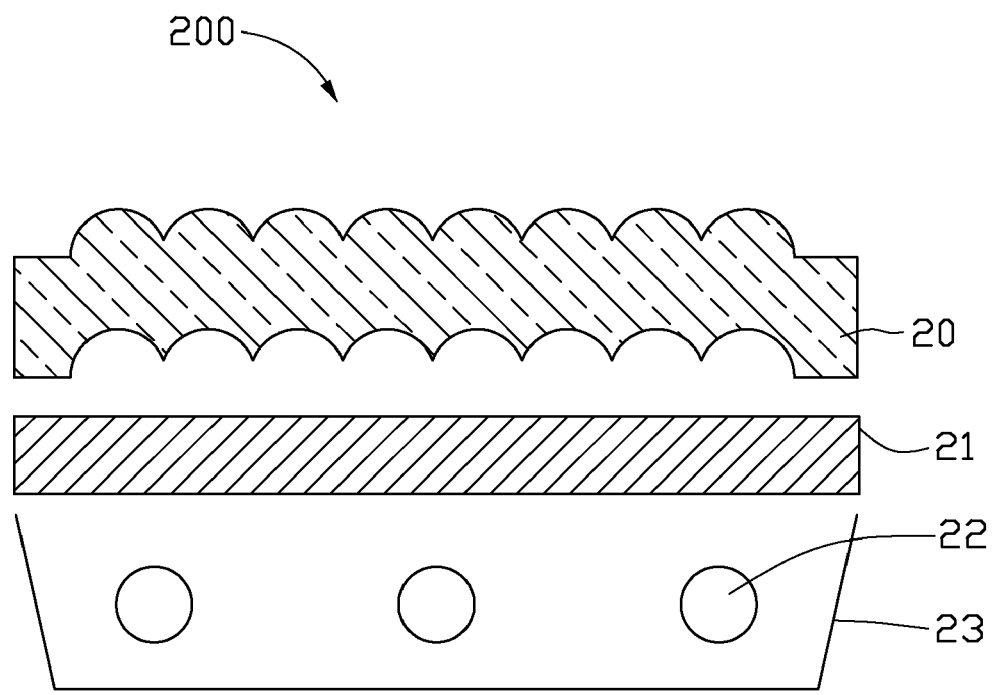
FIG. 1 is a side cross-sectional view of one embodiment of a backlight module, the backlight module including an optical plate, a light diffusion plate, a plurality of linear light sources, and a frame.

Referring to FIG. 1, an embodiment of a backlight module 200 includes an optical plate 20, a light diffusion plate 21, a plurality of linear light sources 22, and a frame 23. The linear light sources 22 are positioned in an inner side of the frame 23. In the illustrated embodiment, the linear light sources 22 are cold cathode tubes. The light diffusion plate 21 is positioned between the optical plate 20 and the light sources 22 positioned above a top of the frame 23.

Figure 2:
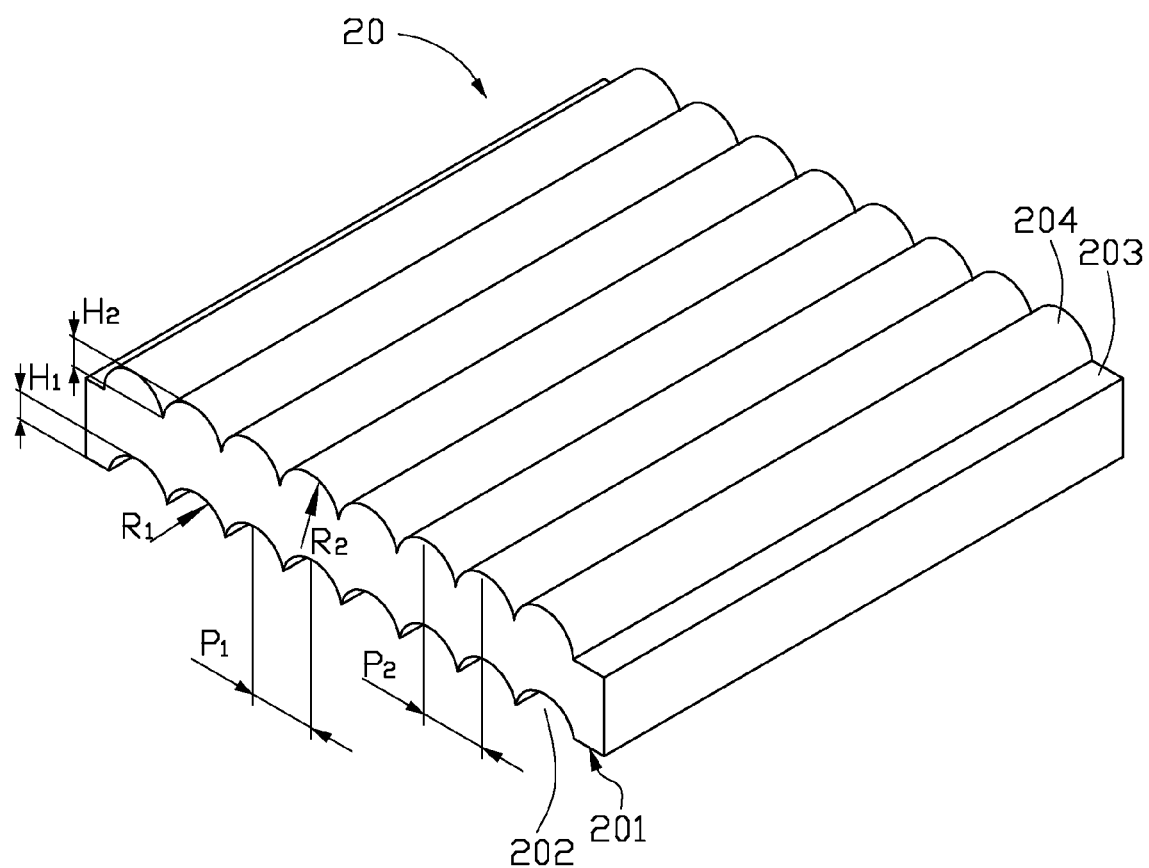
FIG. 2 is an isometric view of the optical plate of the backlight module of FIG 1.

Referring to FIG. 2, the optical plate 20 has a first surface 201 and a second surface 203 opposite the first surface 201. The first surface 201 defines a plurality of substantially parallel elongated arc-shaped grooves 202. A plurality of substantially parallel elongated arc-shaped protrusions 204 are formed on the second surface 203. An extending direction of the elongated arc-shaped grooves 202 is substantially parallel to an extending direction of the elongated arc-shaped protrusions 204. In the illustrated embodiment, the extending direction of the elongated arc-shaped protrusions 204 is parallel to a longitudinal direction of the linear light sources 22.

In the illustrated embodiment, a cross-section of each arc-shaped groove 202 taken along a plane perpendicular to an extending direction of the elongated arc-shaped grooves 202 is substantially semicircular. The elongated arc-shaped grooves 202 are distributed side by side to each other in the first surface 201. A radius $R_1$ of each elongated arc-shaped groove 202 is in a range from about 0.01 millimeters to about 3 millimeters. A pitch $P_1$ between adjacent elongated arc-shaped grooves 202, measured between two corresponding points on the cross-section lines, is in a range from about 0.025 millimeters to about 1.5 millimeters. A depth $H_1$ of each elongated arc-shaped groove 202 is in the range from about 0.01 millimeters to about 3 millimeters. In the illustrated embodiment, the radius $R_1$ is about 0.1375 millimeters, the pitch $P_1$ is about 0.275 millimeters, and the depth $H_1$ is about 0.11 millimeters.

A cross-section of each arc-shaped protrusion 204 taken along a plane perpendicular to the extending direction of the elongated arc-shaped protrusions 204 is substantially semi-circular. The elongated arc-shaped protrusions 204 are distributed side by side on the second surface 203. The radius $R_2$ defined by each elongated arc-shaped protrusion 204 is preferably in the range from about 0.01 millimeters to about 3 millimeters. A pitch $P_2$ of adjacent elongated arc-shaped protrusions 204, measured between two corresponding points on the cross-section lines, is in the range from about 0.025 millimeters to about 1.5 millimeters. A height $H_2$ of each elongated arc-shaped protrusion 204 is in the range from about 0.01 millimeters to about 3 millimeters. In the illustrated embodiment, the radius $R_2$ is about 0.1375 millimeters, the pitch $P_2$ is about 0.275 millimeters, and the height $H_2$ is about 0.11 millimeters.

A thickness T of the optical plate 20 is in the range from about 0.5 millimeters to about 3 millimeters. The optical plate 20 may be made of a transparent material such as polycarbonate, polymethyl methacrylate, polystyrene, and copolymer of methyl methacrylate and styrene.

In the illustrated embodiment, the optical plate 20 is employed in the backlight module 200 such that the first surface 201 is facing the linear light sources 22 and the second surface 203 is facing away from the linear light sources 22. Light enters the optical plate 20 via the first surface 201. Because the inner surfaces of the elongated arc-shaped grooves 202 are curved and the outer surfaces of the elongated arc-shaped protrusions 204 are also curved, incident light that may have been internally reflected on a flat surface, are refracted, reflected, and diffracted. As a result, light outputted from the second surface 203 is more uniform than light outputted from a light output surface of a typical optical plate. Light spots caused by the light sources seldom occur. In addition, there is no need to add an extra upper light diffusion film between the optical plate 20 and the liquid crystal display panel. Thus, the efficiency of light utilization is enhanced.

The frame 23 has a highly reflective inner surface.

Figure 3:
FIG. 3 is a photo showing an illumination distribution of the optical plate of FIG 1.
Figure 4:
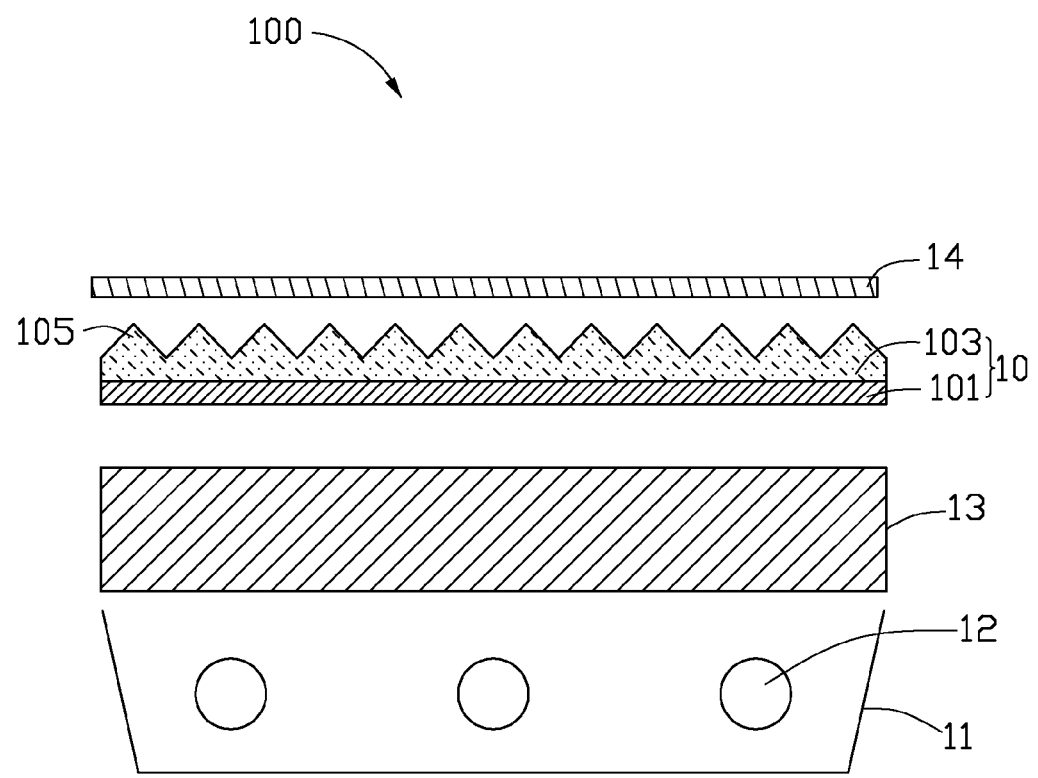
FIG. 4 is a side cross-sectional view of a typical backlight module, the typical backlight module including a typical prism sheet.
Figure 5:
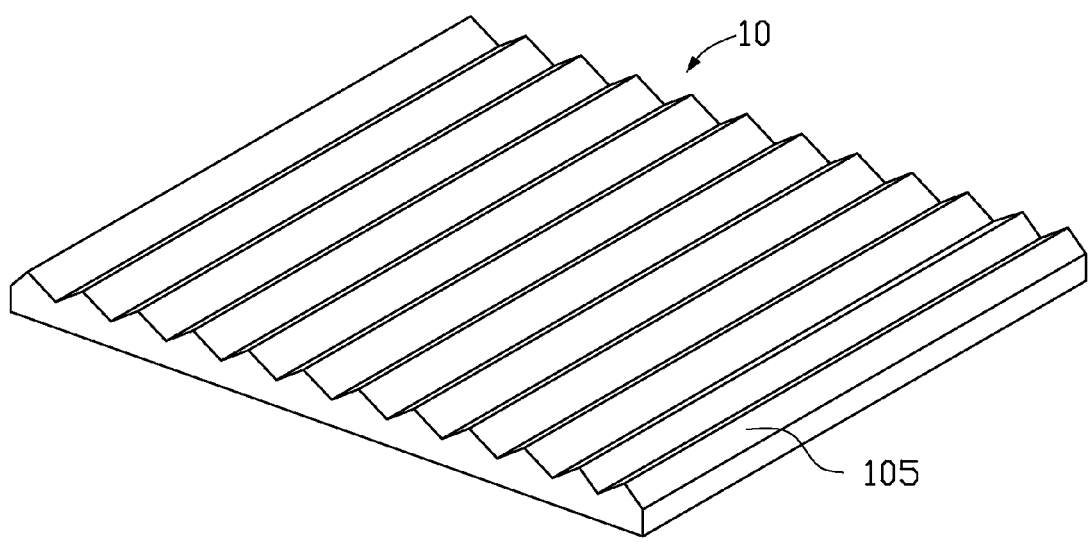
FIG. 5 is an isometric view of the typical prism sheet of the typical backlight module of FIG. 4.

Referring to FIG. 3, an illumination distribution of the optical plate 20 is shown. Light emitted from the optical plate 20 forms a uniform surface light source. The test result shows that the light emitted by the optical plate 20 is more uniform. Thus, when the optical plate 20 is employed in the backlight module 200, light spots of the light sources seldom occur, more uniform light is achieved, and an upper light diffusion film between the optical plate 20 and the liquid crystal display panel 25 is not needed. Thus, the efficiency of light utilization is enhanced.

In addition, since the optical plate 20 is integrally formed by injection molding technology, the optical plate 20 has a relatively high rigidity and mechanical strength It may be appreciated that the linear light sources 22 may be replaced by a plurality of point light sources such as light-emitting diodes, distributed in rows.

Finally, while the embodiments have been described and illustrated, the invention is not to be construed as being limited thereto. Various modifications can be made to the embodiments by those of ordinary skilled in the art without departing from the true spirit and scope of the invention as defined by the appended claims.

What is claimed is:

1. An optical plate comprising:
a first surface defining a plurality of substantially parallel elongated arc-shaped grooves therein and
a second surface opposite the first surface, wherein a plurality of substantially parallel elongated arc-shaped protrusions is formed on the second surface; an extending direction of the elongated arc-shaped grooves is substantially parallel to an extending direction of the elongated arc-shaped protrusions.

2. The optical plate of claim 1, wherein the plurality of elongated arc-shaped grooves are distributed side by side in the first surface.

3. The optical plate of claim 1, wherein a cross-section of each elongated arc-shaped groove taken along a plane perpendicular to the extending direction of the elongated arc-shaped grooves is substantially semicircular.

4. The optical plate of claim 1, wherein a radius defined by each elongated arc-shaped groove is in the range from 0.01 millimeters to 3 millimeters.

5. The optical plate of claim 1, wherein a pitch of adjacent elongated arc-shaped grooves, measured between two corresponding points on the cross-section lines, is in the range from 0.025 millimeters to 1.5 millimeters.

6. The optical plate of claim 1, wherein a depth of each elongated arc-shaped groove is in the range from 0.01 millimeters to 3 millimeters.

7. The optical plate of claim 1, wherein the thickness of the optical plate is in the range from 0.5 millimeters to 3 millimeters.

8. The optical plate of claim 1, wherein a cross-section of each elongated arc-shaped protrusion taken along a plane perpendicular to the extending direction of the elongated arc-shaped protrusions is substantially semicircular.

9. The optical plate of claim 1, wherein the plurality of elongated arc-shaped protrusions are distributed side by side on the second surface.

10. The optical plate of claim 1, wherein a radius defined by each elongated arc-shaped protrusion is in the range from 0.01 millimeters to 3 millimeters.

11. The optical plate of claim 1, wherein a pitch of adjacent elongated arc-shaped protrusions, measured between two corresponding points on the cross-section lines, is in the range from 0.025 millimeters to 1.5 millimeters.

12. The optical plate of claim 1, wherein a height of each elongated arc-shaped protrusion is in the range from 0.01 millimeters to 3 millimeters.

13. The optical plate of claim 1, wherein a material of the optical plate is selected from the group consisting of polycarbonate, polymethyl methacrylate, polystyrene, and copolymer of methylmethacrylate and styrene.

14. A backlight module comprising:
a frame;
a plurality of light sources positioned in an inner surface of the frame;
a light diffusion plate positioned on atop of the frame above the light sources; and
an optical plate positioned on the light diffusion plate, the optical plate comprising a first surface defining a plurality of parallel elongated arc-shaped grooves therein and a second surface opposite the first surface, wherein a plurality of parallel elongated arc-shaped protrusions are formed on the second surface, and an extending direction of the elongated arc-shaped grooves are parallel to an extending direction of the elongated arc-shaped protrusions.

15. The backlight module of claim 14, wherein the optical plate is employed in the backlight module such that the first surface is facing the light sources and the second surface is facing away from the light sources.

16. The backlight module of claim 14, wherein the light sources are linear light sources.

17. The backlight module of claim 16, wherein the extending direction of the elongated arc-shaped protrusions are substantially parallel to a longitudinal direction of the light sources.

18. The backlight module of claim 14, wherein the frame has a highly reflective inner surface.

* * * * *